(12) United States Patent
Schneider

(10) Patent No.: US 9,291,833 B1
(45) Date of Patent: Mar. 22, 2016

(54) REMOVABLE PACKAGING EYEWEAR BLANK

(71) Applicant: Jack Michael Schneider, Newport Beach, CA (US)

(72) Inventor: Jack Michael Schneider, Newport Beach, CA (US)

(*) Notice: Subject to any disclaimer, the term of this patent is extended or adjusted under 35 U.S.C. 154(b) by 155 days.

(21) Appl. No.: 14/222,247

(22) Filed: Mar. 21, 2014

(51) Int. Cl.
*G02C 1/00* (2006.01)
*G02C 11/02* (2006.01)
*G02C 11/00* (2006.01)

(52) U.S. Cl.
CPC ............... *G02C 11/02* (2013.01); *G02C 11/00* (2013.01)

(58) Field of Classification Search
CPC ..................................................... G02C 5/008
USPC ......... 351/63, 51, 52, 115, 111, 41, 158, 178; 359/465
See application file for complete search history.

(56) References Cited

U.S. PATENT DOCUMENTS

| | | | | |
|---|---|---|---|---|
| 2,323,518 A * | 7/1943 | Cochran | ............... | G02C 5/006 351/49 |
| 2,426,266 A * | 8/1947 | Haas | ................ | G02C 7/10 2/450 |
| 4,776,686 A * | 10/1988 | Stanley | ................ | G02C 5/006 351/115 |
| 6,641,260 B1 * | 11/2003 | Avital | ................ | G02C 5/006 351/115 |
| 7,625,081 B2 * | 12/2009 | Margolis | ............... | G02C 5/008 351/178 |
| 7,938,535 B2 | 5/2011 | Orlinsky et al. | | |

* cited by examiner

*Primary Examiner* — Hung Dang
(74) *Attorney, Agent, or Firm* — Williams Intellectual Property; Benjamin F. Williams

(57) ABSTRACT

A removable packaging eyewear blank including a perforated boundary disposed to delimit eyewear in a packaging, whereby the eyewear is removable from the packaging and wearable by a user.

8 Claims, 3 Drawing Sheets

REMOVABLE PACKAGING EYEWEAR BLANK

BACKGROUND OF THE INVENTION

Various types of promotional packaging are known in the prior art. However, what is needed is a removable packaging eyewear blank that includes a packaging having a perforated boundary disposed to delimt eyewear removable from the packaging, whereby removal of the eyewear opens the packaging and enables wearing of eyewear devised to celebrate a particular event, holiday, or other occasion, as case may be.

FIELD OF THE INVENTION

The present invention relates to a removable packaging eyewear blank, and more particularly, to a removable packaging eyewear blank that includes a perforated boundary disposed in a packaging, said perforated boundary delimiting eyewear therein, whereby the eyewear is selectively removable from the packaging for wear by a user in celebration of an event, holiday, or other occasion, as desired.

SUMMARY OF THE INVENTION

The general purpose of the removable packaging eyewear blank, described subsequently in greater detail, is to provide a removable packaging eyewear blank which has many novel features that result in a removable packaging eyewear blank which is not anticipated, rendered obvious, suggested, or even implied by prior art, either alone or in combination thereof.

The present removable packaging eyewear blank has been devised to enable removal of eyewear from a product packaging and provide promotional novelty to particular products thereby. The present removable packaging eyewear blank, as presented herein, is directed to disposition as part of a packaging for a carton of beer. However, additional packaging for additional products is contemplated as part of this invention.

The present removable packaging eyewear blank, therefore, includes a perforated boundary disposed in a packaging, said perforated boundary disposed delimiting an eyewear thereby removable from said packaging. The eyewear includes a pair of arms, a pair of eye-loops, and a bridge, and is removable from the packaging for wear upon the head of a user.

Each of the pair of arms includes an earpiece and a temple. Each earpiece is disposed endwise upon each arm, there disposed for engagement upon the ear of a person wearing the eyewear. The temple is a linear portion of each arm disposed between the earpiece and the associated eye-loop.

Each of the pair of eye-loops includes a removable center having a shaped perimeter. The shaped perimeter may be reminiscent of the silhouette of an object, such as a bat, a cat, a star, a moon, or other object, as case may be, indicative of a specific event, occasion, holiday, or other object or item, as desired when promoting a particular product for a specific or other occasion. In the preferred embodiment herein disclosed, the shaped perimeter is taken to resemble a pumpkin, and the beer packaging therefore marketed as a promotional for Halloween. Of course, additional embodiments are taken as inclusive, and the present example is not intended to otherwise limit the device by particularity.

The present removable packaging eyewear blank is contemplated to be stamped into the packaging at time of manufacture. In the preferred embodiment herein disclosed, the eyewear is disposed upon the packaging with each of the pair of arms disposed vertically oriented on parallel side faces of a carton of beer. The pair of eye-loops and bridge are disposed oriented horizontally upon the top side of the carton of beer. A user may, therefore, readily detach the perforated boundary to remove the eyewear from the packaging, simultaneously opening the packaging whereby beer is dispensable from the opening formed by the removal of the eyewear. The user thence detaches the removable center, and the eyewear is wearable, as desired.

It is contemplated that the present removable packaging eyewear blank may be termed "beer goggles" and provide added humor and conviviality to any occasion whereat beer is consumed and, specifically, thereby increase sales of product as promotional packaging selectable for novelty.

Thus has been broadly outlined the more important features of the present removable packaging eyewear blank so that the detailed description thereof that follows may be better understood and in order that the present contribution to the art may be better appreciated.

Objects of the present removable packaging eyewear blank, along with various novel features that characterize the invention are particularly pointed out in the claims forming a part of this disclosure. For better understanding of the removable packaging eyewear blank, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
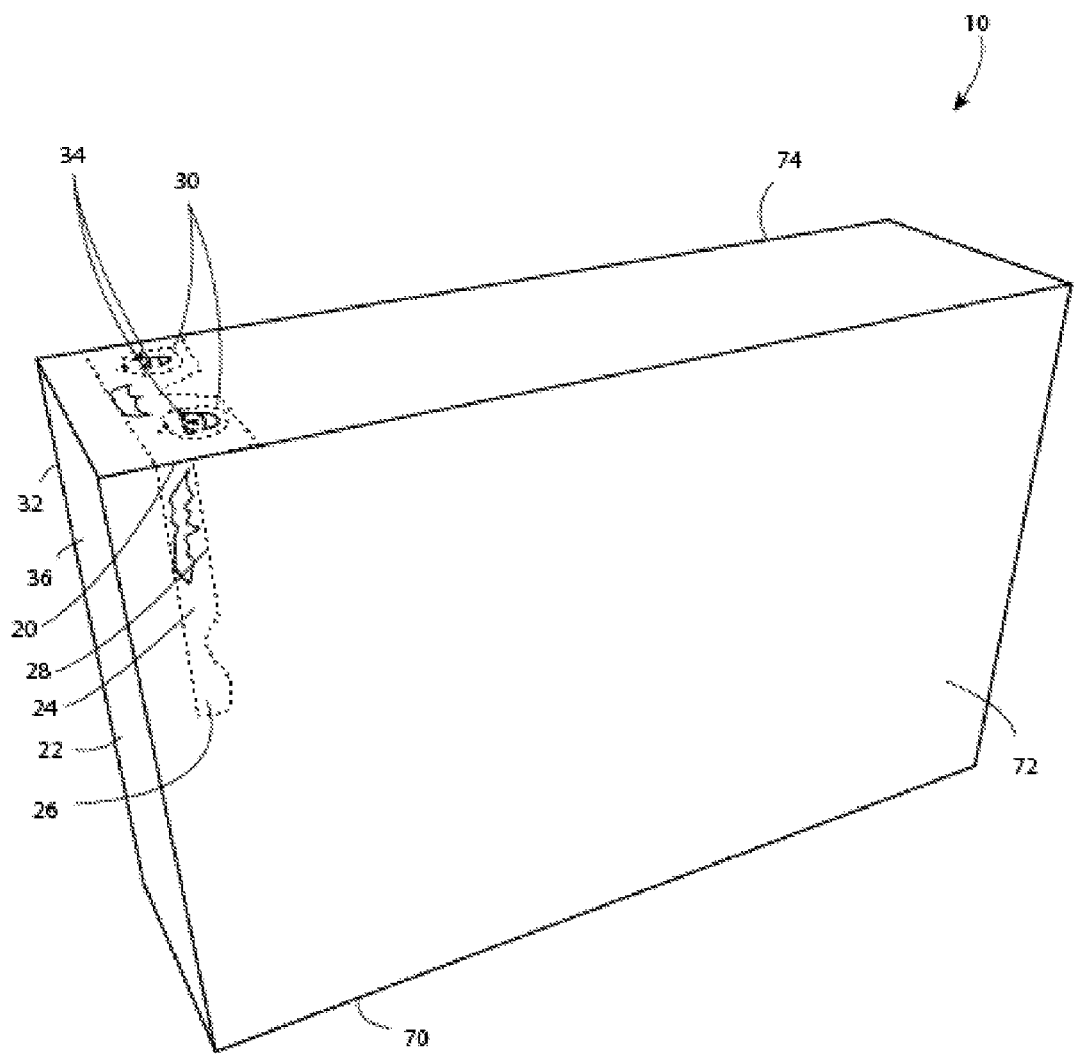
FIG. 1 is an isometric view of a packaging wrapped to a product.
Figure 2:
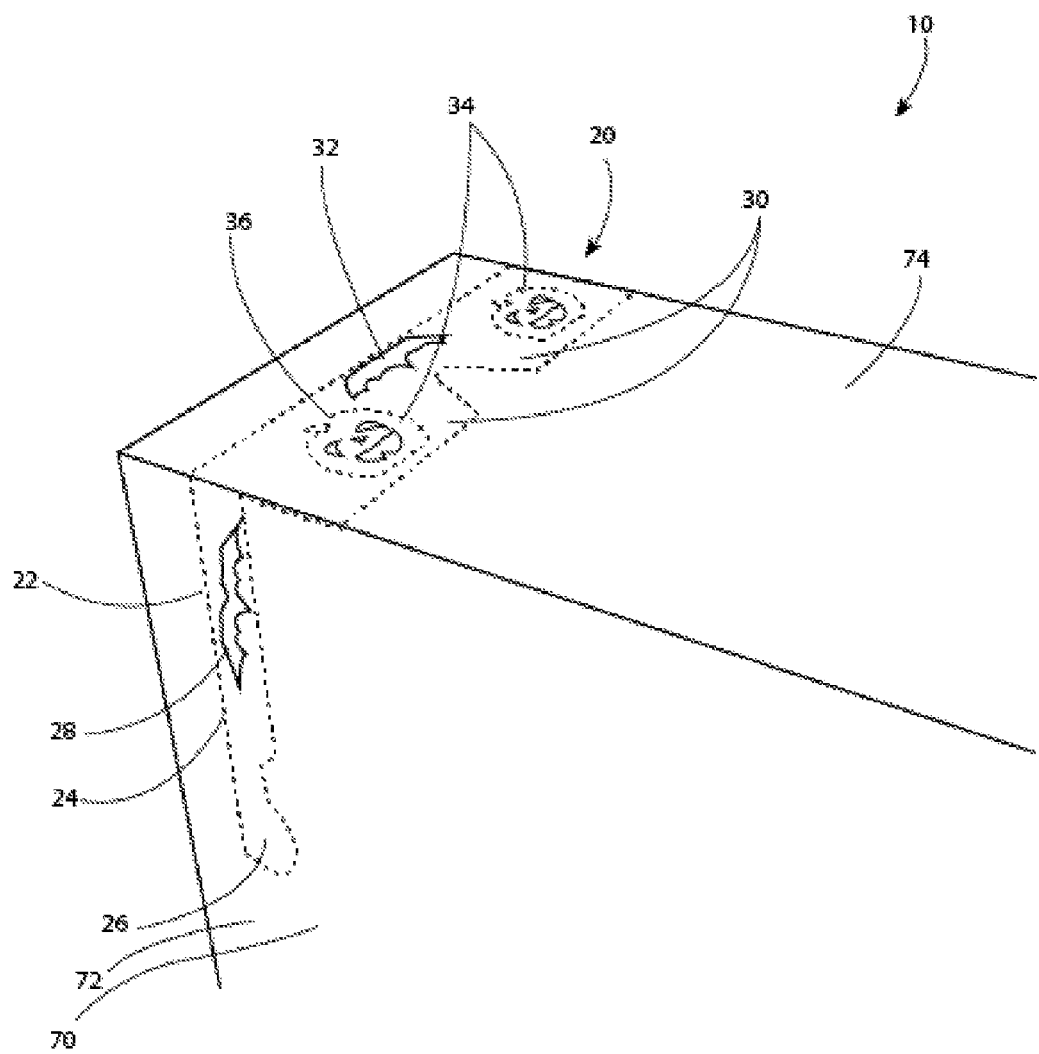
FIG. 2 is an detail view of the packaging wrapped to a product.
Figure 3:
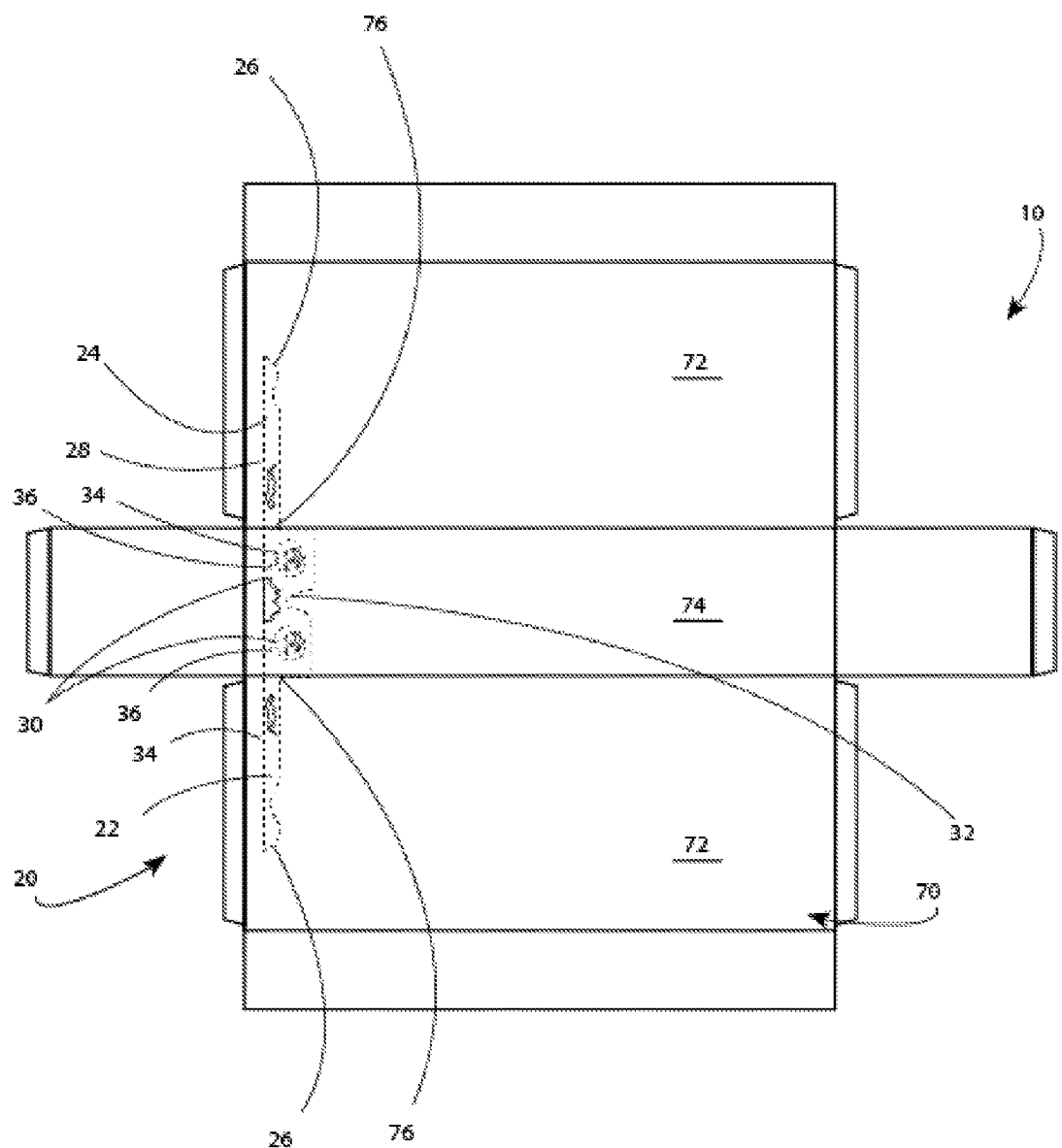
FIG. 3 is a view of the packaging before being wrapped to a product.

With reference now to the drawings, and in particular FIGS. 1 through 3 thereof, example of the instant removable packaging eyewear blank employing the principles and concepts of the present removable packaging eyewear blank and generally designated by the reference number 10 will be described.

Referring to FIGS. 1 through 3 a preferred embodiment of the present removable packaging eyewear blank 10 is illustrated.

The present removable packaging eyewear blank 10 has been devised to enable removal of eyewear 20 from a packaging 70 for wear by a user. In the preferred embodiment herein disclosed, the packaging 70 is contemplated to be packaging used for beverages, specifically alcoholic beverages such as beer, and the eyewear 20 is removable by detachment of a perforated boundary 22 delimiting the eyewear 20 within said packaging 70 for wear upon the head of a user.

The removable packaging eyewear blank 10, therefore, includes a perforated boundary 22 disposed in a packaging 70, said perforated boundary 22 enabling removal of an eyewear 20 from the packaging 70. Removal of the eyewear 20 from the packaging 70 may also simultaneously open the packaging 70 for dispensation of product therefrom.

The eyewear 20 includes a pair of arms 24. Each of the pair of arms 24 includes an earpiece 26 and a temple 28. The term "earpiece", as used herein, is taken to include the endwise portion of the arm 24 which engages upon an ear. Each earpiece 26 may be arced to engage around each ear of a person wearing the eyewear 20. The term "temple", as used herein, is taken to include the linear portion of each arm 24 disposed proximal the temporal and sphenoid bones of the head of a person wearing the eyewear 20.

The eyewear 20 further includes a pair of eye-loops 30 disposed between each of the pair of arms 24, and a bridge 32 disposed between each of the pair of eye-loops 30. The bridge 32 is disposed to overlie the nasal bones of a user wearing the eyewear 20, and each of the pair of eye-loops 30 is thence disposed circumferentially anterior to the eyes of a user whereby said user is enabled to peer through said eye-loops 30 as if wearing a pair of glasses or goggles.

A removable center 34 is disposed within each of the pair of eye-loops 30. The removable center 34 includes a shaped perimeter 36. The shaped perimeter 36 may be reminiscent of the silhouette of an object, such as a bat, for example, a moon, a star, or other recognizable object suited to any particular occasion or event, as case may be. In the preferred embodiment herein disclosed, the removable center 34 is shaped like a pumpkin, and the eyewear 20 therefore suited to sale of a product (in the present example, beer) over the Halloween holiday. However, it should be self-evident that additional shaped perimeters 36 and removable centers 34 are contemplated for use, as desired, when promoting a particular product for a specific event.

In the preferred embodiment herein disclosed, the eyewear 20 is oriented in the packaging 70 so that each arm 24 is removably disposed vertically upon each of a side face 72 of a carton of beer, and the eye-loops 30 and bridge 32 are removably disposed horizontally oriented upon a top side 74 of said carton of beer, whereby each arm 24 is disposed perpendicularly relative the eye-loops 30. The eyewear 20 is, therefore, removable by release of the perforated boundary 22 and each of the arms 24 is thereby disposed perpendicularly relative the eye-loops 30 and the eyewear 20 is thereby wearable upon the head of a user with each of the pair of arms 24 foldable along a preexisting fold line 76 forged in the packaging 70 as a whole.

What is claimed is:

1. A removable packaging eyewear blank comprising a perforated boundary disposed delimiting eyewear in a packaging whereby the eyewear is removable from the packaging and wearable by a user.

2. The removable packaging eyewear blank of claim 1 wherein the eyewear comprises a pair of arms, having an earpiece and a temple, and a bridge disposed between two eye-loops.

3. The removable packaging eyewear blank of claim 2 wherein each of the pair of arms is disposed oriented vertically along each of a side face of the packaging and the eye-loops and bridge are disposed oriented horizontally across a top face of the packaging.

4. The removable packaging eyewear blank of claim 3 wherein a each of the pair of eye-loops includes a removable center whereby each of the pair of eye-loops define an aperture to be worn proximal the eyes when each removable center is removed.

5. The removable packaging eyewear blank of claim 4 wherein each of the pair of arms is foldable most proximal each of the pair of eye-loops along a preexisting fold forged in the packaging as a whole.

6. The removable packaging eyewear blank of claim 5 wherein each removable center is a design element having a boundary reminiscent of a silhouette of an object.

7. The removable packaging eyewear blank of claim 6 wherein the packaging is a carton or box for containing beverages.

8. A removable packaging eyewear blank comprising:
a perforated boundary disposed in a packaging, said perforated boundary enabling removal of an eyewear from the packaging, said eyewear comprising:
a pair of arms, each of said pair of arms having an earpiece and a temple;
a pair of eye-loops disposed between each of the pair of arms;
a bridge disposed between each of the pair of eye-loops;
a removable center disposed within each of the pair of eye-loops;
wherein the eyewear is removable from the packaging and wearable as a pair of eyeglasses, whereby said eyewear includes design elements illustrative of an event, holiday, or other occasion, as desired.

\* \* \* \* \*